U S 0 0 6 0 6 2 7 2 8 A

United States Patent [19]
Breunsbach et al.

[11] Patent Number: 6,062,728
[45] Date of Patent: May 16, 2000

[54] METHOD AND APPARATUS FOR PROFILING A CONVEYOR OVEN

[75] Inventors: Rex L. Breunsbach, Clackamas; Paul M. Austen, Milwaukie, both of Oreg.

[73] Assignee: Electronic Controls Design, Inc., Milwaukie, Oreg.

[21] Appl. No.: 09/032,890

[22] Filed: Feb. 27, 1998

[51] Int. Cl.[7] .............................. G01K 1/14; G01K 3/04; G01K 3/06; G01K 7/04; G08C 17/02
[52] U.S. Cl. ..................... 374/142; 374/137; 374/166; 340/870.17
[58] Field of Search ..................... 374/142, 137, 374/166, 141, 149, 179, 186; 340/870.17; 219/388

[56] References Cited

U.S. PATENT DOCUMENTS

| | | | |
|---|---|---|---|
| 3,609,728 | 9/1971 | Quinn et al. | 340/870.17 |
| 3,635,087 | 1/1972 | Conklin | 371/137 |
| 4,397,569 | 8/1983 | Davis | 374/186 |
| 4,636,093 | 1/1987 | Nagasaka et al. | 374/186 |
| 4,688,039 | 8/1987 | Berk | 374/179 |
| 5,003,160 | 3/1991 | Matsuo et al. | 219/388 |
| 5,161,889 | 11/1992 | Smith et al. | 374/29 |
| 5,564,285 | 10/1996 | Jurewicz et al. | 374/186 |
| 5,572,445 | 11/1996 | Shook et al. | 340/870.17 |
| 5,739,443 | 4/1998 | Saunders | 374/208 |
| 5,820,266 | 10/1998 | Fedak | 374/179 |

FOREIGN PATENT DOCUMENTS

| | | | |
|---|---|---|---|
| 2359010 | 10/1994 | Germany | 374/179 |
| 0149816 | 11/1980 | Japan | 374/137 |
| 0631790 | 11/1978 | U.S.S.R. | 374/137 |

OTHER PUBLICATIONS

Michalski et al., Temperature Measurement, John Wiley & Sons (1991), pp. 399–400.

*Primary Examiner*—Diego Gutierrez
*Assistant Examiner*—Stanley J. Pruchnic, Jr.
*Attorney, Agent, or Firm*—Klarquist Sparkman Campbell Leigh & Whinston

[57] ABSTRACT

An oven analyzer for profiling a conveyor oven is disclosed that accurately and precisely determines the physical characteristics of an oven and stores such information so that it can be outputted to a computer for analysis. In one embodiment, the oven analyzer includes a pallet that moves through the conveyor oven. The pallet houses an electronic data logger that is coupled to multiple sensors. The electronic data logger has memory for storing information obtained from the sensors. A first sensor is a temperature sensor that detects the ambient temperature within the oven. A second sensor is mounted within a metal mass of known thermal characteristics and detects the ovens ability to heat an object. A third sensor detects the position of the pallet within the oven. The electronic data logger stores the data received from the sensors in the memory for selective output to a computer for analysis or printing.

38 Claims, 4 Drawing Sheets

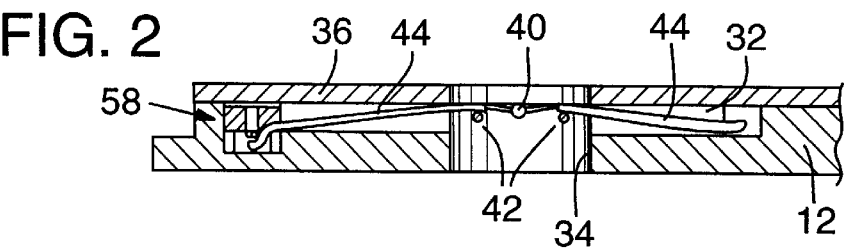
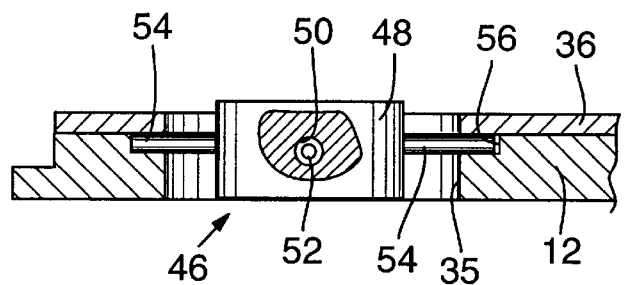
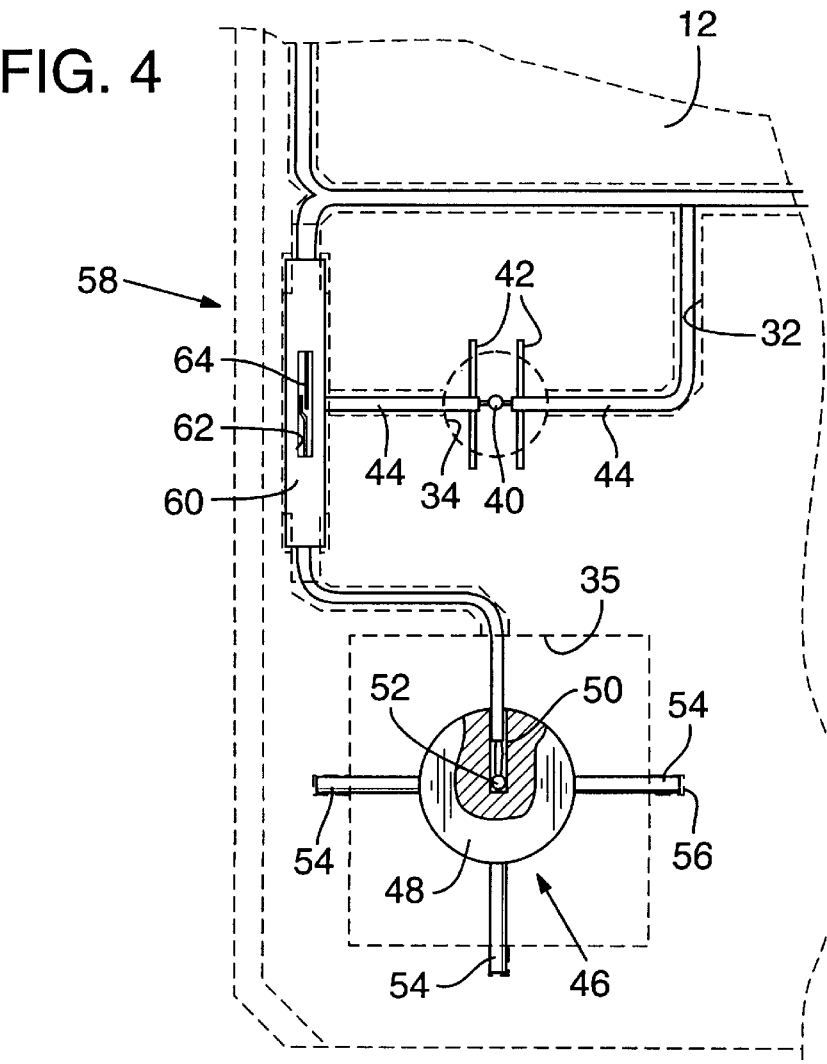

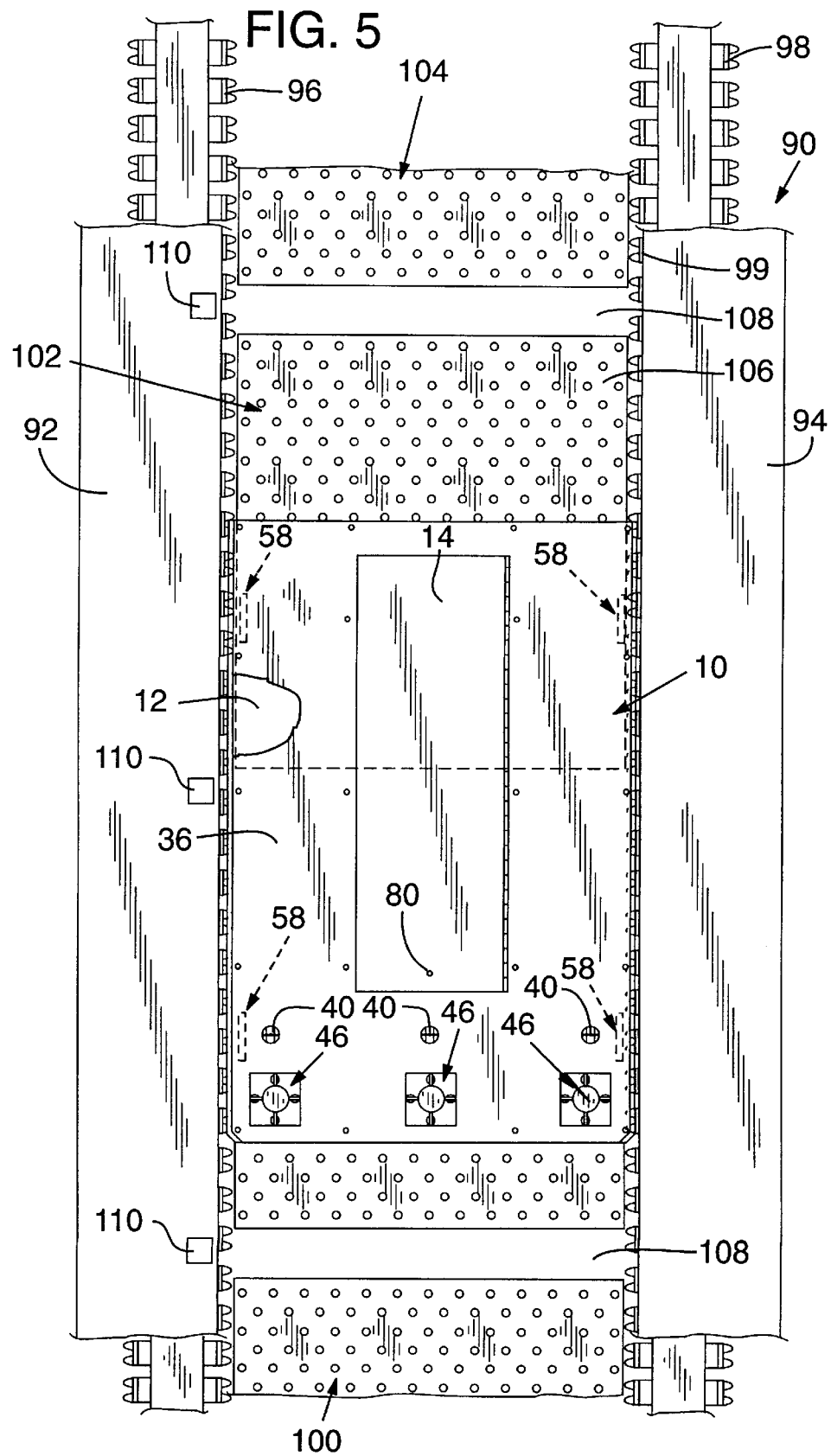

METHOD AND APPARATUS FOR PROFILING A CONVEYOR OVEN

FIELD OF THE INVENTION

This invention pertains to test equipment for sensing, collecting and analyzing physical parameters associated with a conveyor oven.

BACKGROUND OF THE INVENTION

Conveyor ovens are used in a variety of industries including the electronics, baking, and painting industries. Generally, conveyor ovens have multiple heating zones through which products pass. The heating zones are thermally isolated from each other by air curtains or other means. Such thermal isolation allows each zone to be maintained at a temperature that differs from other zones in the oven. A particular advantage of conveyor ovens with multiple heating zones is that the products can be heated to different temperatures at different times as they pass through the oven. In all industries that use conveyor ovens, it is important that the ovens behave consistently over time. However, after extended use, the ovens tend to degrade in performance. Some causes of this degradation include dust accumulating on oven fans and/or process bi-products, such as fluxes, accumulating on fans or blocking exhaust ports.

In the electronics industry, conveyor ovens are used to mount integrated circuits and other electronic components to printed circuit boards (PCBs). The multiple heat zones allow the PCB to be gradually raised in temperature so as to prevent thermal stress to the components and the PCB itself. Solder is placed on the PCB at predetermined points where integrated circuits are to be mounted, prior to running it through the oven. As the PCB passes through the heat zones, the solder melts, bonding the integrated circuits to the PCB. Conventionally, prior to a production run, a large number of test PCBs of the same type were passed through the oven under different heating conditions to ensure the temperature profile of the oven matched the requirements of the PCB. Each PCB was analyzed after its pass and the best setting for the oven was determined based on this analysis. This test process resulted in a significant number of test boards being scrapped due to improper heating or overuse. Other industries using conveyor ovens have experienced similar problems in setting the ovens for a production run.

To better determine optimal temperature settings and maintain existing or known settings without the need for test boards, electronic data loggers (also called data collectors) have been developed that mount to a test PCB. The test PCB has various thermocouples strategically placed thereon, which the data logger monitors. Using the data loggers, the optimal temperature of the oven can be determined. However, known data loggers have not been used to track overall oven performance, primarily because the focus of data loggers is on measuring the temperature of the product passing through the oven, not the oven itself. Additionally, known data loggers do not adequately track temperature data as a function of position in the oven. Although temperature data can be collected, it is difficult to determine at what points or location in the oven the temperature data was collected.

Some companies have attempted to track oven performance by mounting a grid of thermocouples throughout the oven. If oven temperatures change over time, the user can detect these changes and take corrective action. However, the oven temperature is not the only factor in overall oven performance. The amount of air flow in the oven is also a factor in how the oven heats products. For example, many ovens (e.g., convection ovens) use forced air to heat products. Products heated in a convection oven heat more quickly than the same products heated in a standard (non-convection) oven. Consequently, reduced or increased air flow can also degrade oven performance, and temperature monitoring devices are incapable of monitoring such a degradation.

Accordingly, an object of the present invention is to provide an apparatus and method for accurately profiling oven performance. A further object is to provide such an apparatus and method that take into account both air temperature and air flow. A further object is to provide such an apparatus and method that can accurately correlate temperature data to positions within the oven. Still a further object is to provide such an apparatus and method that are easy to use and convenient.

SUMMARY OF THE INVENTION

The present invention is directed to an oven analyzing apparatus and method for profiling oven performance that accurately determine and store the physical characteristics of an oven. The stored information then can be downloaded to a computer for further analysis.

In one aspect of the present invention, the oven analyzing method and apparatus employ a pallet that moves with a conveyor through a conveyor oven. The pallet houses an electronic data logger that is coupled to multiple sensors. A first sensor is a temperature sensor that detects the ambient temperature within the oven. A second sensor is mounted within a metal mass of known thermal characteristics and detects the ovens ability to heat an object. A third sensor detects the position of the pallet within the oven. The electronic data logger stores the data received from the sensors. The stored data can then be downloaded to a computer, which can analyze the data to create an oven profile. The oven profile can be compared to other stored profiles of the same oven to detect oven degradation.

In another aspect of the invention, the pallet has a hole therethrough and the metal mass is suspended within the hole. The hole allows the metal mass to be heated by air below and above the pallet. Additionally, the metal mass is thermally isolated from the pallet so that the most accurate data concerning the oven's ability to heat the mass is obtained.

In yet another aspect of the invention, the position sensor senses position within the oven by using a Reed switch that is actuated when the pallet passes a magnet or magnets mounted to the oven. Thus, accurate position data and conveyor speed can be calculated.

Various advantages and features of novelty which characterize the invention are particularized in the claims forming a part hereof. However, for a better understanding of the invention and its advantages, refer to the drawings and the accompanying description in which there are illustrated preferred embodiments of the invention.

BRIEF DESCRIPTION OF THE DRAWINGS

FIG. 2 is a cross-sectional view of an ambient temperature sensor taken along lines 2—2 of FIG. 1.

FIG. 3 is a cross-sectional view of a mass sensor taken along lines 3—3 of FIG. 1.

FIG. 4 is a partial top view of the pallet as identified in FIG. 1.

FIG. 5 is a schematic top view of a conveyor oven with the oven analyzer of FIG. 1 loaded in its operative position.

DETAILED DESCRIPTION OF A PREFERRED EMBODIMENTS

Figure 1:
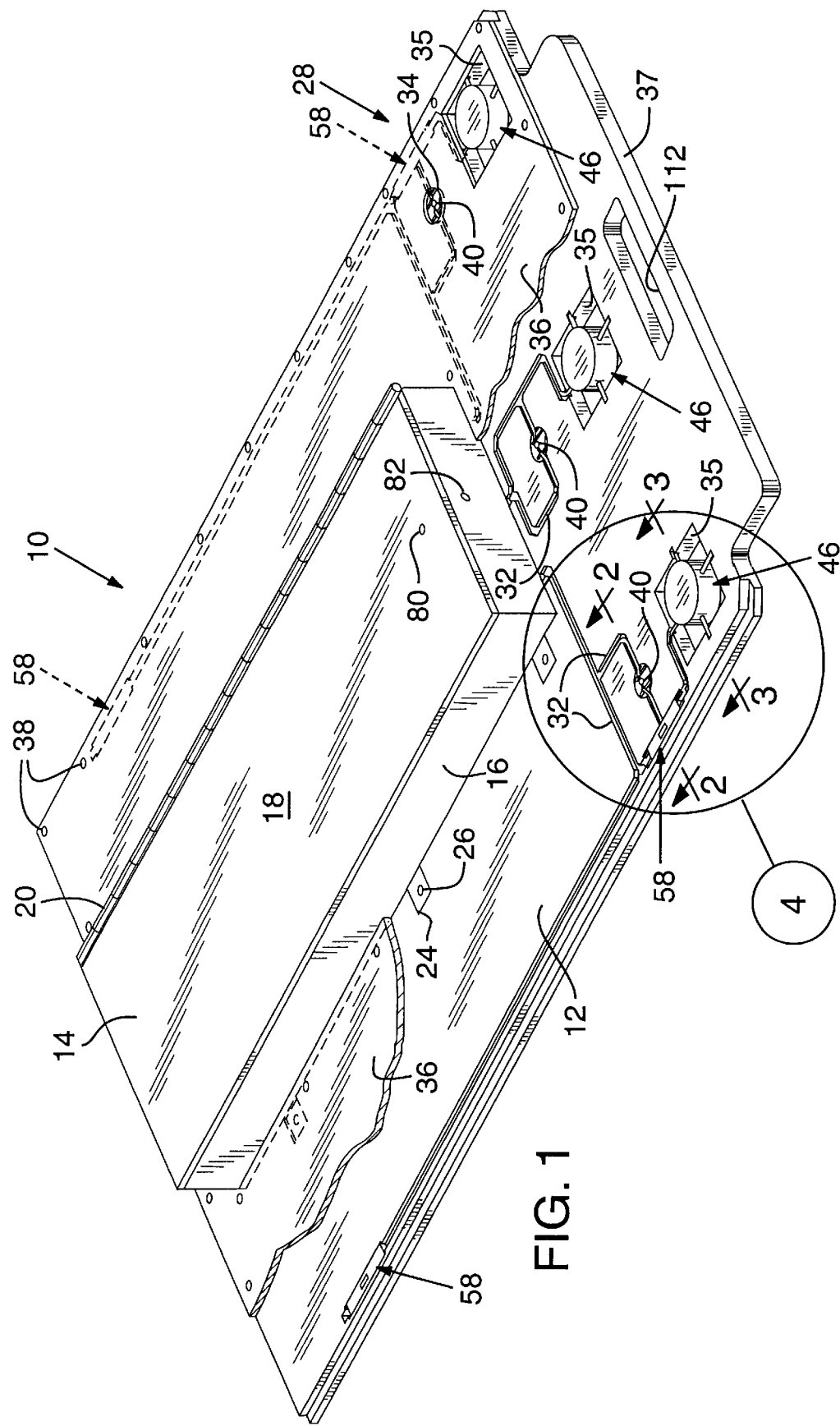
FIG. 1 is a perspective view of an oven analyzer of the present invention as viewed from above and toward the front and one side, and having a plurality of thermally isolated metal masses coupled to a pallet for detecting an oven's ability to heat and a plurality of ambient temperature sensors and position sensors.

FIGS. 1–4 show an oven analyzer 10 according to a currently preferred embodiment of the invention. The oven analyzer 10 includes a flat pallet 12 with a raised housing 14 mounted thereto. The housing 14 is a rectangular box including a base portion 16 and a cover 18 connected to the base portion by a hinge 20. Opposite the hinged edge of the cover is a latch (not shown) that releasably secures the cover in a closed position. The base portion 16 includes tabs 24 extended outwardly therefrom. Screws 26 extend through the tabs for securing the housing 14 to the pallet 12. The oven analyzer 10 also includes sensors shown generally at 28 for sensing temperature and position of the oven analyzer 10 as it passes through a conveyor oven, as is further described below. An electronic data logger 30 (not shown in FIG. 1, but represented in the electrical schematic of FIG. 6) is removably stored within the housing 14. The data logger 30 is a thin planar device that monitors, collects, and stores information from sensors 28, as is further described below.

Although the pallet 12 can be made from a wide variety of materials, it preferably has high thermal and mechanical stability and low thermal conductivity. The pallet may be made from a material that includes carbon for electrostatic dissipation and a glass-reinforced resin that is thermally stable above solder melting points (approximately 350° F. to 600° F.). A suitable pallet material is available from a French company, Von Roll Isola, Inc., with offices in North Clarendon, Vt., sold under the trademark CDM-ESD. The pallet has channels 32 etched therein for running signal conductors 33 (see FIG. 6) from the sensors 28 to the data logger 30 within the housing 14. Holes, shown generally at 34 and 35, extend through the pallet 12 and are circular and square in shape, respectively. Other hole shapes may be used instead, but the thermal impact on the sensors should be taken into account. Sensors 28 are mounted within the holes 34 so that the sensors are exposed to ambient air above and below the pallet 12. The pallet 12 includes a cover 36 secured to a pallet base 37 by screws 38. The cover 36 covers the tabs 24 and the signal conductors within the channels 32. The illustrated pallet cover 36 is made from the same material as the pallet base 37, but other materials may be used.

The sensors 28 include ambient air temperature sensors 40. The ambient temperature sensors 40 are thermocouples that include two dissimilar metallic conductors welded together at their ends. Such thermocouples produce a voltage signal proportional to their temperature, as is well understood in the art.

The ambient temperature sensors 40 detect the actual ambient air temperatures within the conveyor oven and constantly produce signals indicative of those temperatures. The sensors 40 are mounted within the holes 34 in the pallet 12. As seen most clearly in FIG. 1, there are three ambient air temperature sensors 40 spaced-apart from each other along the orthogonal lateral axis of the pallet 12. Such spacing of the sensors 40 allows for temperature data collection at the center, and at the right and left sides, of the conveyor oven. Thus, uneven temperatures across the oven are easily detected and stored in data logger 30. As shown most clearly in FIGS. 2 and 4, the ambient air temperature sensors 40 are supported within the holes 34 by two parallel bars 42 extending beneath the conductor leads or legs 44 of sensor 40 to support the opposing legs 44 which form the thermocouple 40 at their juncture. FIG. 2 clearly shows the two legs 44 forming the thermocouple of a temperature sensor 40 and supported within channel 32 and secured in place by cover 36.

As most clearly shown in FIGS. 1, 3 and 4, the sensors 28 also include mass sensors 46. Mass sensors 46 are used to detect the ovens ability to heat a metal mass by measuring the change in temperature of the mass at different points in the oven. Sensing the change in temperature of the metal mass allows for a determination of the oven's ability to heat an object, which is related to both air flow and temperature. The mass sensors 46 include a metal mass 48 with a cavity 50 centrally located therein (FIG. 4). A temperature sensor 52, such as a thermocouple, is secured within the cavity by a conductive paste (not shown). The mass sensors 46 are suspended centrally within rectangular holes 35 in the pallet 12 so that the mass sensors 46 are exposed to oven air above and below the pallet. Three supporting rods 54 have one of their respective ends attached to the metal mass 48 and extend radially outwardly therefrom (FIG. 4). The opposite ends of the supporting rods 54 are secured within grooves 56 (See FIG. 3) in the pallet 12. The rods are spaced about the periphery of the metal mass approximately 90 degrees apart. The cover 36 secures the rods 54 (and consequently the mass sensors 46) in place within their grooves. Almost any metal of high specific heat can be used for the metal masses 48. For example, the metal masses 48 can be formed of aluminum, brass, stainless steel, steel, copper, etc. Additionally, non-metals with a high-specific heat can be used (e.g., polytetrafluoroethylene). Preferably, the supporting rods are formed from a metal that has low thermal conductivity, such as stainless steel, to thermally isolate the metal masses 48 from the pallet 12, but other metals can be used. As shown, the metal masses are disc-shaped, but other shapes (e.g., spheres, squares, etc.) can also be used. Additionally, the metal masses are preferably sized (although not necessarily required) so that they do not reach the ambient temperature of the oven as the pallet 12 passes therethrough.

The sensors 28 also include position sensors 58 as shown in FIGS. 1 and 4. The position sensors 58 are used to detect the position of the pallet 12 as it passes through the conveyor oven. Such position information is stored within the electronic data logger 30. In the illustrated embodiment, the position sensors 58 include Reed switches 64 (FIG. 4) that are activated in response to a magnetic field. As is further described below, magnets are mounted within the conveyor oven at predetermined positions along the conveyor path. As the pallet 12 passes the magnets in its travel through the oven, the position sensors 58 are activated. As shown in FIG. 1, four position sensors 58 are mounted on the pallet 12-two on opposite sides at the front of the pallet and two on opposite sides at the rear of the pallet 12. The position sensors 58 include a PCB 60 (FIG. 4) with a centrally located slot 62 therein. The slot 62 is sized slightly smaller than the Reed switch 64 and is used during manufacturing to easily mount the Reed switch to the PCB. The PCB is then inverted and mounted with the Reed switch down in a groove within the pallet. FIG. 4 shows the Reed switch 64 as seen through the slot 62 in the PCB 60. Although the position sensor is shown as a Reed switch, a wide variety of sensors can be used. For example, photoelectric sensors, acoustical sensors, infrared or other optical sensors, or mechanical switches can be used in place of the Reed switches. The invention should not be limited to any particular type of sensor now available or later developed.

Figure 6:
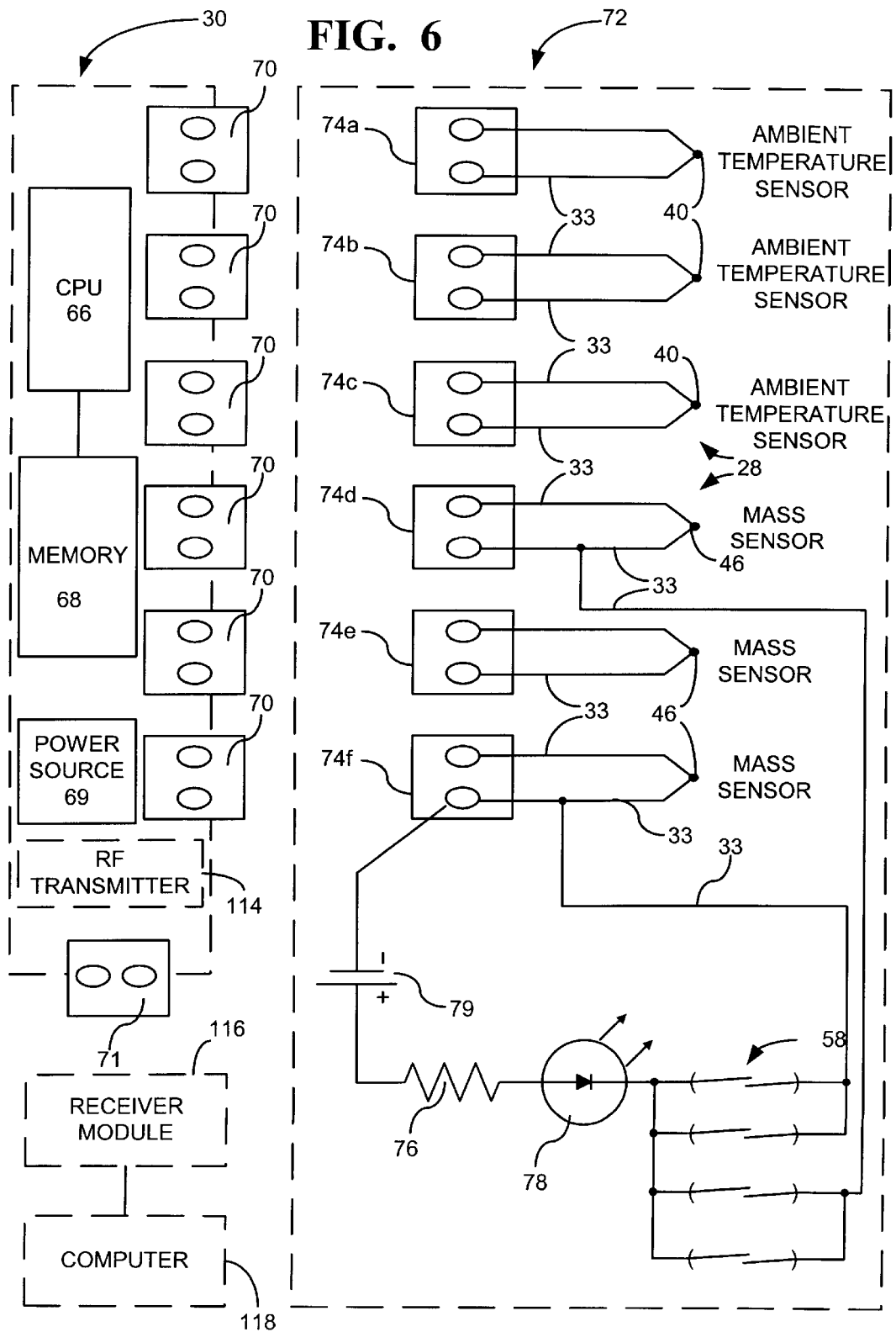
FIG. 6 is a circuit diagram of the oven analyzer of FIG. 1.

FIG. 6 shows an electrical diagram of the oven analyzer 10. The electronic data logger 30 includes a central processing unit (CPU) 66 coupled to a memory 68. The CPU 66 reads the sensors 28 and stores the sensor data within the memory 68. The data logger 30 also includes a power source 69. The electronic data logger 30 also includes a plurality of input ports 70 along one edge thereof for removably coupling the data logger 30 to the housing 14. A suitable data logger 30 is available from Electronic Controls Design, Inc. of Milwaukie, Oreg., and is sold under the trademark SUPER M.O.L.E. GOLD®. The M.O.L.E.® also includes a data output port 71 for passing data stored in memory 68 to a computer, which can then provide the desired computations, such as calculating a temperature profile and conveyor speed as described herein. The pallet 12 includes a connector 72 mounted within the housing 14. The connector 72 includes ports 74a–f that are matable to the input ports 70 of the data logger 30. The ports 74a–f are coupled to the ambient temperature sensors 40, the mass sensors 46, and the position sensors 58, as shown. The particular electrical connections are not important to the invention, as many different electrical connections may be used so long as the data is accurately passed from the sensors to the electronic data logger 30. A resistor 76 and LED 78 combination is serially coupled to the four position sensors 58. A voltage source 79 is mounted in the housing 14 and supplies current to the resistor 76 and LED when at least one position sensor is activated. Consequently, when at least one of the position sensors is activated by detection of a magnetic field in the conveyor oven, a circuit loop is closed and the LED illuminates. The LED is mounted within the housing 14. Indicator holes 80, 82 (See FIG. 1) in the cover 18 and base portion 16, respectively, of the housing allow a user to see the LED within the housing 14 when looking from in front of or above the oven analyzer 10. To conserve input ports, two of the position sensors 58 are coupled to the same input port 74d as one mass sensor 46, and two other position sensors are coupled to the same input port 74f as another mass sensor. When the position sensors 58 are activated, an unusual increase in voltage occurs on the input ports 74d and 74f coupled to the position sensors. This voltage increase indicates that a position sensor has been activated. During this brief period when the position sensor is activated, data from the mass sensors on the same input ports 74d, 74f cannot be accurately obtained. However, the temperatures of the masses change so slowly, that such temperature information can be reasonably interpolated from temperature measurements prior to and after the unusual voltage increase. Of course, the invention may be modified to add additional ports or remove ports as needed for a particular application.

FIG. 5 shows a top view of the oven analyzer 10 passing through a portion of a known conveyor oven 90 (with the top of the conveyor oven removed for illustration). Although any conveyor oven may be used, the illustrated conveyor oven 90 includes opposing side rails 92, 94 that cover opposing linked conveyor chains 96, 98. The linked chains 96, 98 are driven by a suitable motor (not shown). The links in the chains, such as link 99, project a sufficient distance beyond the rails 92 and 94 so that the pallet can rest thereon. The pallet 12 rides on the linked chains 96, 98 to simulate products that are carried on the chains in the same fashion.

Thus, the opposing conveyor chains 96, 98 support and carry the oven analyzer 10 through the conveyor oven 90. The conveyor oven 90 includes a plurality of different temperature zones, as indicated generally at 100, 102 and 104. Although only three temperature zones are shown, the ovens usually have additional temperature zones. Each temperature zone includes a perforated metal plate, such as metal plate 106 in zone 102, having a grid of air holes formed therein. The air holes in the metal plate 106 are used to deliver air maintained at a desired temperature into the temperature zone. Exhaust ports 108 are formed by gaps between the zones. A fan (not shown) sucks air through the exhaust ports and recirculates the air by delivering it through the grid of holes in the metal plates. Sucking air through the exhaust ports effectively creates an air curtain between the temperature zones, allowing the zones to be maintained at different temperatures. In other words, the generated air curtains thermally isolate the zones from one another.

A plurality of position indicating devices 110 are spaced-apart along rail 92 and are placed adjacent each of the exhaust ports 108. The position indicating devices 110 cooperate with the position sensors 58 mounted on the pallet 12 of the oven analyzer 10, as is further described below. For convenience, the pallet 12 has position sensors 58 mounted on both sides thereof so that the position indicating devices 110 can be positioned on either or both of the opposing rails 92, 94. The illustrated position indicators 110 are magnets. Other types of position indicators can be used to cooperate or mate with the position sensors already described. As the pallet 12 passes through the conveyor oven, at least one position sensor 58 will at some point be positioned directly adjacent at least one position indicating device 110. As a result, the position sensor 58 is activated, closing a circuit and activating LED 78 (FIG. 6). The illuminated LED may be seen through indicator holes 80, 82 in the housing 14. The electronic data logger 30 periodically (e.g., every 100 ms) samples all of its input ports 70 (which are connected to ports 74a–f) and such sampled data is stored in memory 68. Thus, the data from sensors 40, 46 is stored in memory 68. The activation of the position sensor 58 is also detected by the electronic data logger 30 and stored in memory 68. Instead of or in addition to periodic sampling, the electronic data logger may also read the mass sensors 46 and the ambient temperature sensors 40 in response to different events, such as the activation of at least one position sensor 58. In any event, temperature information received from sensors 40, 46 is stored in association with position information received from a position sensor 58. Consequently, accurate oven and mass temperature data can be correlated with a position in the conveyor oven. The oven temperature is the ambient temperature of the oven, while the mass temperature can be used to determine the oven's ability to heat (which is related to air flow). Conveyor speed can also be calculated by measuring a time lag between activation of the forward and rear position sensors 58 as they pass a given position indicator 110.

The data that is accumulated in the electronic data logger 30 can be downloaded through output port 71 to a computer (not shown) after running through the conveyor oven. The data can be used for statistical process control (SPC). Statistical process control focuses on whether an overall process is performing properly, rather than on whether any particular product is within specification, as is well-known in the art.

A handle 112 (FIG. 1) may be mounted to the front of the pallet 12 to allow an operator to easily carry the oven analyzer 10. Alternatively, the handle can be omitted as shown in the FIG. 5 embodiment. Additionally, a ruler (not shown) may be added along the longitudinal axis or the orthogonal axis of the pallet for convenient measuring of the oven zones.

The oven analyzer of the present invention provides several advantages. Foremost, the oven analyzer monitors the oven's ambient air temperature in different zones and the oven's ability to heat a known mass. It also accurately correlates such temperature information to known positions in the oven. The components for accomplishing this are all mounted to one easy-to-use pallet. Additionally, visual sensors help an operator to test the oven analyzer 10 to ensure the system is properly functioning. Furthermore, the oven's conveyor speed can be obtained through direct position and time measurements. Also, both the pallet and data logger are portable and separable from one another for ease of downloading and interchangeability of data loggers.

Having described and illustrated the principles of our invention with reference to preferred embodiments thereof, it will be apparent that these embodiments can be modified in arrangement and detail without departing from the principles of the invention.

Although a particular conveyor oven is shown (i.e., including air curtains, etc.), the present invention can be used in virtually any conveyor oven. The oven used is not of importance to the invention.

As described herein, the base portion 16 provides the pallet with modularity. That is, the electronic data logger 30 may be replaced without disturbing the sensor connections on the pallet 12. Although, an electronic data logger 30 is used, the information from the sensors can be transmitted directly by cable, RF signals, or optical means to a monitoring device external to the oven. The electronic data logger may transmit the temperature and position information through RF transmissions (see FIG. 6 at 114) to a receiver module 116 coupled to a computer 118.

Additionally, although the sensors are shown suspended in holes, they can be suspended from the pallet in other ways. For example, they can hang from the pallet or a separate supporting device may be mounted to the pallet for suspending the sensors. Still further, the sensors do not need to be suspended at all, and can be directly mounted to the pallet.

Moreover, although the mass sensors and ambient temperature sensors are shown mounted in separate holes, they may be mounted in the same hole.

In view of the wide variety of embodiments to which the principles of our invention can be applied, it should be apparent that the detailed embodiments are illustrative only and should not be taken as limiting the scope of my invention. Rather, we claim as our invention all such modifications as may come within the scope of the following claims and equivalence thereto:

We claim:

1. An oven analyzer for profiling a conveyor oven, comprising:
   a pallet having top and bottom surfaces, a longitudinal axis, and an orthogonal lateral axis, the pallet further having first and second sets of holes passing therethrough from the top to bottom surfaces, the holes being spaced apart from each other;
   a plurality of metal masses wherein one metal mass is suspended in each hole of the first set of holes and wherein each metal mass has a cavity formed therein;
   a first set of temperature sensors, wherein one temperature sensor is mounted within the cavity of each metal mass for sensing a temperature of the metal mass;
   a second set of temperature sensors, wherein one temperature sensor of the second set is suspended within each hole of the second set of holes for sensing an ambient temperature of the conveyor oven;
   a position sensor mounted to the pallet and responsive to passing predetermined positions in the conveyor oven;
   an electronic data logger having memory for storing temperature information, the electronic data logger coupled to the position sensor and the first and second set of thermocouples; and
   wherein the electronic data logger receives a signal from the position sensor when the pallet passes the predetermined positions in the conveyor oven and wherein the electronic data logger reads temperature data from the first and second sets of temperature sensors and stores the temperature data within the memory of the electronic data logger along with position data received from the position sensor.

2. The oven analyzer of claim 1 wherein the metal masses are sized with respect to the conveyor oven such that the temperatures of the masses do not exceed the ambient temperature of the oven through which they pass.

3. The oven analyzer of claim 1 wherein the position sensor includes a switch responsive to a magnetic field.

4. The oven analyzer of claim 1 wherein the metal masses are suspended in the holes by pins having a low thermal conductivity, wherein a first end of the pins are mounted to the metal mass and the second end of the pins are mounted to the pallet.

5. An oven analyzer for profiling a conveyor oven, comprising:
   a pallet having top and bottom surfaces, a longitudinal axis, and an orthogonal lateral axis, wherein the pallet is sized for passing through the conveyor oven;
   at least a first set of temperature sensors mounted on the pallet for providing temperature information associated with an air temperature within the conveyor oven;
   at least one set of metal masses, wherein each of the metal masses are coupled to the pallet such that they are thermally isolated from the pallet and wherein the metal masses are spaced-apart from each other on the pallet to profile different areas within the conveyor oven;
   at least a second set of temperature sensors wherein each of the second set of temperature sensors is mounted to one of the metal masses; and
   an electronic data logger for storing the temperature information associated with the air temperature received from the first set of temperature sensors and for storing temperature Information associated with the metal masses received from the second set of temperature sensors.

6. The oven analyzer of claim 5 wherein the electronic data logger is mounted on the pallet and is directly coupled to the temperature sensors and a position sensor.

7. The oven analyzer of claim 5 wherein the electronic data logger transmits the temperature information through RF transmissions to a receiver module coupled to a computer.

8. The oven analyzer of claim 5 wherein the metal masses are suspended from the pallet.

9. The oven analyzer of claim 8 wherein the pallet has a set of holes therethrough and the metal masses are suspended within the holes so as to be thermally isolated from the pallet.

10. The oven analyzer of claim 5 wherein the first set of temperature sensors are suspended from the pallet and sense the ambient air temperature within the conveyor oven.

11. The oven analyzer of claim 5 wherein the first set of temperature sensors include a thermocouple.

12. The oven analyzer of claim 5 further including a position sensor that includes a switch responsive to a position indicating device on the conveyor oven.

13. The oven analyzer of claim 12 wherein the position sensor includes a switch that is responsive to a magnetic field in the conveyor oven through which it passes.

14. The analyzer of claim 5 wherein the metal masses are spaced-apart along the orthogonal lateral axis of the pallet and the second set of temperature sensors include thermocouples mounted within the metal masses for sensing the temperature of the metal masses.

15. The oven analyzer of claim 5 wherein the electronic data logger includes a power source, a CPU, and a data memory and wherein the temperature information is stored in the data memory as a function of position information.

16. The oven analyzer of claim 5 further including a light source that is activated in response to a position sensor passing predetermined positions in the conveyor oven.

17. A method of profiling a conveyor oven, comprising the steps of:
 (a) providing a pallet having a temperature sensor and a position sensor mounted thereon;
 (b) moving the pallet through the conveyor oven;
 (c) detecting positions of the pallet at predetermined points along the path of travel of the pallet through the conveyor oven by activating the position sensor at such points;
 (d) storing temperature information obtained from the temperature sensor as a function of positions sensed by the position sensor;
 (e) providing a metal mass mounted to the pallet;
 (f) detecting the temperature of the metal mass; and
 (g) storing the detected temperature of the metal mass.

18. An oven analyzer for profiling a conveyor oven, comprising:
 a pallet having a length and a width sized for passing through the conveyor oven;
 at least a first temperature sensor mounted on the pallet for providing temperature information associated with an air temperature within the conveyor oven;
 a plurality of metal masses mounted across the pallet that are used to determine the conveyor oven's ability to heat the metal masses, wherein the metal masses are mounted to the pallet so as to be thermally isolated from the pallet; and
 at least a second temperature sensor mounted to at least one of the metal masses that detects the temperature of the at least one metal mass.

19. The analyzer of claim 18 further including a position sensor mounted on the pallet and further including means on the pallet for transmitting temperature information and position information from the temperature and position sensor to an associated data collection and storage means.

20. The analyzer of claim 18 wherein the at least one temperature sensor includes a first temperature sensor for sensing ambient air temperatures within the conveyor oven and a second temperature sensor for sensing the temperature of a known mass carried by the pallet.

21. The analyzer of claim 18 wherein the first temperature sensor includes multiple said first sensors spaced across the width of the pallet, and the second temperature sensor includes multiple said second sensors spaced across the width of said pallet.

22. The analyzer of claim 21 including multiple position sensors including one adjacent a leading end of the pallet and another near a trailing end of the pallet.

23. An oven analyzer for profiling a conveyor oven, comprising:
 a support member having an orthogonal lateral axis sized for passing through the conveyor oven;
 at least three metal masses positioned along the orthogonal lateral axis of the support member such that at least one metal mass is positioned adjacent each side of the support member and one metal mass is positioned between the other two metal masses; and
 a set of temperature sensors wherein one temperature sensor is mounted adjacent to or within each metal mass for sensing the temperature of the metal mass and for delivering temperature sensor data.

24. The oven analyzer of claim 23 wherein the support member is a pallet.

25. The oven analyzer of claim 23 wherein the metal masses are sized with respect to the conveyor oven such that the temperatures of the masses do not exceed the ambient temperature of the oven through which they pass.

26. The oven analyzer of claim 23 wherein there are exactly three metal masses with one metal mass positioned adjacent a side edge of the support member, a second metal mass positioned opposite the first metal mass adjacent an opposing side edge of the support member and a third metal mass centrally located on the support member.

27. The oven analyzer of claim 23 further including an electronic data logger having memory for storing temperature information, the electronic data logger for coupling to the temperature sensors, reading the temperature sensors and storing the temperature sensor data.

28. The oven analyzer of claim 27 wherein the data logger reads the temperatures at a predetermined period of time and stores the temperature sensor data in a memory.

29. An oven analyzer for profiling a conveyor oven, comprising:
 a pallet having top and bottom surfaces, a longitudinal axis, and an orthogonal lateral axis, wherein the pallet is sized for passing through the conveyor oven;
 at least one temperature sensor mounted on the pallet for providing temperature information associated with an air temperature within the conveyor oven;
 a position sensor mounted on the pallet for providing position information in response to passing predetermined locations within the conveyor oven; and
 an electronic data logger for storing the temperature and position information received from the temperature and position sensors, wherein the electronic data logger includes a power source, a CPU, and a data memory and wherein the temperature information is stored in the data memory as a function of the position information.

30. The oven analyzer of claim 29, further including a mass coupled to the pallet and at least a second temperature sensor coupled to the mass that detects a temperature of the mass.

31. The oven analyzer of claim 30 wherein the mass is a metal mass.

32. An oven analyzer for profiling a conveyor oven, comprising:
 a support member;
 multiple masses having known weights mounted to the support member wherein the masses are mounted to the support member such that they are thermally isolated from the support member, the known masses being sized such that they can be used to detect the conveyor oven's ability to heat the known masses, wherein the masses are spaced apart from each other on the pallet to profile different areas within the conveyor oven;

at least one mass temperature sensor mounted within one of the known masses that senses a temperature of the known mass; and at least one ambient air temperature sensor mounted to the support member that senses an air temperature.

33. The oven analyzer of claim 32 wherein the support member is a pallet.

34. The oven analyzer of claim 32 wherein the known masses are formed from a metal having high specific heat.

35. The oven analyzer of claim 32 further including a data logger coupled to the at least one mass temperature sensor and the at least one ambient air temperature sensor for storing the temperature information of at least one of the multiple masses and air temperature, wherein the electronic data logger includes a CPU and a data memory.

36. The oven analyzer of claim 32 further including a position sensor mounted on the pallet for providing position information in response to passing predetermined locations within the conveyor oven.

37. An oven analyzer for profiling a conveyor oven, comprising:

a first means for sensing a temperature of multiple known masses;

a second means for sensing air temperature;

means for supporting the first and second means, wherein the known masses are mounted to the means for supporting such that they are thermally isolated from the means for supporting and wherein the known masses are spaced apart from each other on the means for supporting such that they can profile different areas within the conveyor oven; and means for recording temperature information provided from the first and second means to record the temperature of the known mass and record the air temperature.

38. The oven analyzer of claim 37 further including means for determining position of the support means in the conveyor oven.

* * * * *